United States Patent [19]
Wiedenmann

[11] 3,853,429
[45] Dec. 10, 1974

[54] MOTOR PUMP COMBINATION

[75] Inventor: Walter Wiedenmann, Kongen, Germany

[73] Assignee: Gunther Eheim, Esslingen, Germany

[22] Filed: June 28, 1973

[21] Appl. No.: 374,750

[30] Foreign Application Priority Data
Sept. 14, 1972 Germany.............................. 2245009

[52] U.S. Cl.................................. 417/356, 417/424
[51] Int. Cl............................................. F04b 17/00
[58] Field of Search............................ 417/356, 424

[56] References Cited
UNITED STATES PATENTS

| | | | |
|---|---|---|---|
| 2,004,866 | 6/1935 | Haldeman........................... | 417/424 |
| 3,749,528 | 7/1973 | Rousseau et al.................... | 417/424 |
| 3,750,951 | 8/1973 | Perl..................................... | 417/424 |

FOREIGN PATENTS OR APPLICATIONS

| | | | |
|---|---|---|---|
| 472,581 | 5/1969 | Switzerland......................... | 417/424 |

Primary Examiner—C. J. Husar
Attorney, Agent, or Firm—Flynn & Frishauf

[57] ABSTRACT

To permit submerged operation, the motor is formed as a synchronous motor, in which a coil is totally encapsulated in plastic material, the coil being toroidal and having end ferromagnetic disks above and below the coil, the disks being alternately supplied with inner pole faces, in the form of sections or strips of a cylinder, defining a cylindrical space within which a permanent magnet rotor can rotate. The cylindrical strips are formed with cut-outs, so that the magnetic field will be unsymmetrical, thus establishing a rotating field. The pole faces are separated from the rotor by plastic material, the rotor being integrally connected to the hub of an impeller for the pump.

18 Claims, 7 Drawing Figures

Fig. 5
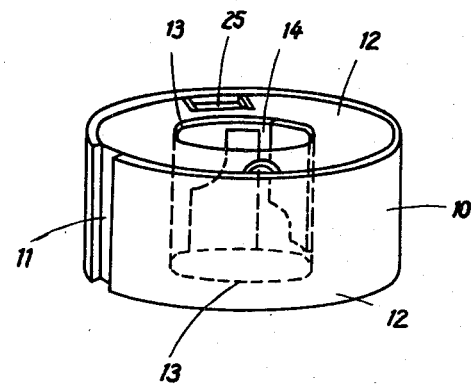
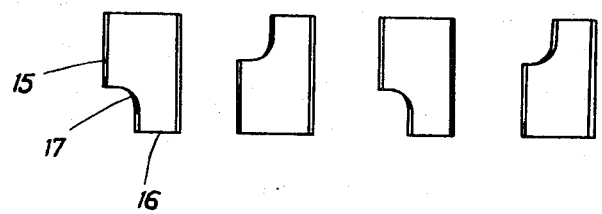
Fig. 6
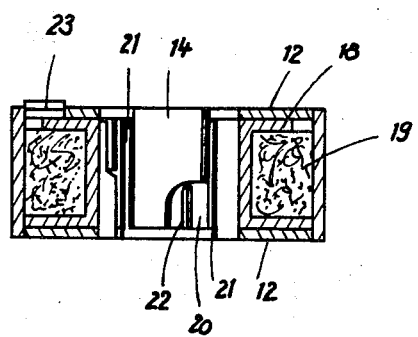
Fig. 7

MOTOR PUMP COMBINATION

Cross reference to related application: U.S. Ser. No. 374,794 filed: June 28, 1973.

The present invention relates to a motor and pump combination, and more particularly to a motor-pump which can operate submerged, that is, which does not require a seal between the motor and the pump unit, especially adapted for small pumps, such as are used in combination with fish tanks and the like.

Motor and pump combinations which include a motor coupled integrally to an impeller pump have been previously proposed. Several of these constructions utilize housings for the motor which are hermetically sealed, so that they can be used submerged under water. Most of such motor-pump combinations utilize universal-type motors or asynchronous motors. Such motors are comparatively expensive to construct and relatively complicated.

Motor-pump combinations which are to supply only little pressure, for example motor-pump combinations used in home fish tanks, circulating water displays or the like, require motor-pump combinations which are much less complicated and less expensive than large-power or hig-volume pumps.

It is an object of the present invention to provide a motor-pump combination which is reliable in operation, small in size, and simple to construct, and requiring little or no maintenance, without, however, being inefficient in operation or suitable only for very limited output.

Subject matter of the present invention:

Briefly, the motor is formed as a synchronous motor with a permanent magnet rotor. The synchronous motor has a toroidal coil, the end faces of which are covered by end disks of magnetic material. Projecting from the end disks, in alternate arrangement, are cylindrical strips, or segments, which are non-symmetrical, so as to provide a rotating magnetic field within which the permanent magnet rotor may turn. The coil, and disks (and the surrounding ferromagnetic cylindrical strip to close the magnetic circuit) are located within a housing portion which is cup-shaped, and totally encapsulated, so that the electrical portion of the motor is sealed in plastic material and separated from the rotating element thereof by a cylindrical inner thin plastic liner or sleeve. The rotor of the motor is directly coupled to an impeller. Complicated seals are thereby avoided.

The asymmetrically constructed pole shoes provide for self-starting, in one direction, in spite of the relatively large air gap. The rotor additionally is subjected to a slightly oscillating axial movement which minimizes wear on the shaft and bearing. The motor only requires a simple toroidal coil, which is simple to construct, and the entire construction of the motor-pump unit can be made as a plastic molding or extrusion, in which the relatively movable parts are easy to assemble with a minimum of assembly steps and operations.

The structure permits casting the stator, with all the associated elements (coil, pole shoes, and magnetic parts) into a plastic casting mass, which provides for hermetic sealing of all the stator components so that the motor-pump combination is excellently suited for submerged operation. The bearings are preferably elastically supported in the housing, by suspending a central stationary shaft in rubber bushings set into the housing, the bearings then being formed as sleeves of suitable material, for example plastic, surrounding the central shaft, the rotor and impeller being connected by a sleeve fitting around the shaft. Suspending the rotor on such a sleeve-type axle provides for quiet operation of the rotor and the impeller, and particularly effective absorption of vibration, and particularly of vibration at critical speeds, which may cause resonance effects. Quietness of operation is particularly important for home use, typically for use with fish tanks.

The impeller blades are preferably elastic material which can deflect, secured in a hub by a swing connection, so that, upon starting of the motor, the torque required is less than the torque which is necessary for pumping, upon increasing speed, since under action of centrifugal force, the impeller blades will swing outwardly to assume essentially radial direction. The impeller blades are preferably made of rubber, or other flexible material, which has the tendency to spring back into oriented position when deflected, which increases the starting effectiveness of the motor, as well as quietness in operation.

In a preferred form, the hub is so constructed that it is formed with axially extending holes, located close to the circumference, with passages extending towards the circumference in the form of key-hole slots, the impeller blades being formed with cylindrical projections fitting into the holes, so that the impeller blades can swing back and forth through the extent of the key-hole slot, pivoting within the holes. The impellers can thus readily be replaced in case they wear; further, the entire assembly can readily be matched to various types of motors, of different power requirements and power capabilities, by retaining the rotor assembly for a plurality of different types of motors, and changing merely the length of the impeller blades or vanes fitted in the retaining holes. The impeller blades are held in position by means of a snap ring fitted against the impeller hub.

The invention will be described by way of example with reference to the accompanying drawings, wherein:

FIG. 5 is a perspective partly phantom view of the stator of the motor unit;

FIG. 6 is a developed view of the pole shoes of the motor;

and FIG. 7 is a sectional view through the stator coils of the motor, and partly a side view of the pole shoes of the stator assembly.

Figure 1:
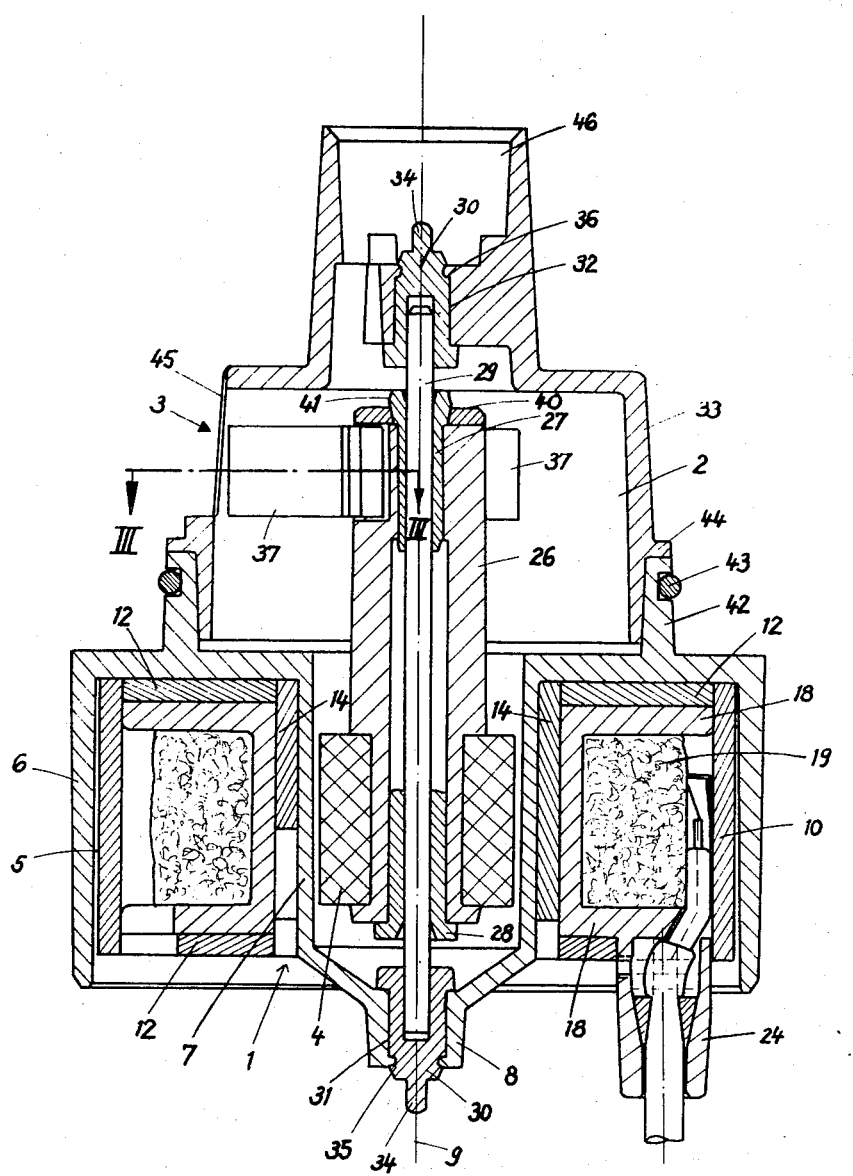
FIG. 1 is a vertical longitudinal sectional view through the motor-pump assembly taken along line I—I of FIG. 2.

Basically, the combination of the pump-motor comprises an electric motor 1, which drives an impeller 3 operating within a pump chamber 2, and coaxially coupled with the rotor 4 of the electric motor 1 (FIG. 1).

Motor 1 is a self-starting synchronous motor having a permanent magnetic rotor 4 which, in the embodiment of the present invention, is a four-pole rotor. The rotor 4 is radially polarized, so that four magnetic poles with changing polarity are uniformly distributed around the rotor circumference. The rotor 4 cooperates with a stator 5 which is generally cup-shaped, and located in a plastic housing 6 which has a cylindrical sleeve 7 fitted interiorly thereof. Sleeve 7 is open at the top and closed at the bottom, at 8. The cylindrical sleeve 7 is located in the air gap between the stator 5 and the rotor 4. It is coaxial to the axis of rotation 9 of the rotor 4 (FIG. 1).

The stator 5 (details of which are seen in FIGS. 5–7) has a cylindrical outer strip 10 which is opened at one side by a longitudinal slit 11, and two end cover plates or disks 12, which are likewise of ferromagnetic substance. The end disks 12, typically of iron, are formed with a central cylindrical opening 13 into which pole shoes 14 are set as seen in the developed view of FIG. 6, that is, they are alternately secured to the top, and bottom disks 12, respectively (see FIG. 5), leaving a small gap between the end of the pole shoe and the disk 12 to which they are not secured. The pole shoes 14 are non-symmetrical. They have parallel sides, curved in the form of cylindrical segments, and made of sheet iron; a cut-out or notch 17 is taken out of part of the side 15 and part of the end 16, see FIG. 6. The notch 17 provides for a non-symmetrical flux distribution between the air gap. The pole shoes 14 are so fixed into the stator that they are alternately magnetically connected to one of the end disks, that is, are in intimate magnetic flux relationship connected thereto, as best seen in FIG. 5. The arrangement thus is a salient pole motor, in which a toroidal coil 19 located within a coil form 18 generates magnetic flux which passes through the outer sleeve 10 of the stator in axial direction, is radially directed by the end disks 12 inwardly to the pole shoes 14 and must pass over air gaps to the rotor 4, since the pole shoes 14 are isolated from each other by air gaps. A torque is thus generated, as well known.

The non-symmetrical arrangement of the pole shoes 14, due to the notches 17, ensures self-starting of the motor and further contributes to a certain axial pulsation of the rotor 4, which decreases wear on the bearings.

The coil form 18 is formed with recesses 20 in the region of its inner opening, which are separated from each other by molded strips or separating ridges 21. The recesses 20 are arranged to receive the pole shoes 14 and secure them in proper aligned and oriented position. The intermediate strips 21, as well as strips 22 (FIG. 7) ensure proper position of the pole shoes 14 in the coil form 18. The coil form 18 is additionally formed at its end face with a projection 23 (FIG. 7) which has the dual use of providing a connecting stub for the wires (FIG. 1) feeding coil 19 as well to form a locating projection for a matching notch 25 in the associated end disk 12, to properly located the end disk 12 on the coil form. A similar matching projection 23 and notch 25 are at the other end face of the coil form 18 and the other disk 12, and not shown in FIG. 7 for simplicity. They may be aligned, or offset with respect to the notch-projection combination shown in FIG. 5.

Stator 4 and the pole shoes 14 not otherwise secured therein, as well as coil 19, and coil form or carrier 18 are located in the housing 6 and secured therein by means of an encapsulating or casting compound. An end cover may additionally be placed over the end face, not separately shown in FIG. 1, and sealed into the unit, or connected by means of an O-ring, and a snap connection to provide a water-tight closure. The current carrying and moisture sensitive coil 19 is thus completely encapsulated and sealed against moisture, while simultaneously pole shoes 14 and all other components within housing 6 are located in place.

Rotor 4 and impeller 3 are connected by means of an elongated hub 26, which has two bearing sleeves 27, 28 set therein. The bearing sleeves are preferably of plastic material, and may have an extended bearing surface (see FIG. 1). Hub 26 is rotatably journalled on a fixed central shaft 29 by means of these bearing sleeves 27, 28. Shaft 29, itself, is located in rubber bushings 30 (FIG. 1).

The large bearing surfaces of bearings 27, 28 provide for long bearing life and smooth operation. Alternatively, the shaft 26 could be secured to fixed bearing pins which are separately supported in end bearings which, in turn, are elastically suspended in the housing.

The two rubber bushings 30 form end closures for the assembly. The lower rubber bushing 30 is fitted into a matching opening 31 in the cylindrical sleeve 7. The upper rubber bushing 30 is fitted in an opening 32 in a top pump chamber cover 33, removably secured to the housing portion 6. The upper covering or housing portion 33 includes the pump chamber 2 therein. The rubber bushings 30 are formed with a projecting tip 34, to provide a gripping surface for a suitable gripping tool, for example pliers. They can be inserted into the fitting opening in the housing, and then pulled into position from the outside until matching shoulders and grooves 35, 36 engage to provide for secure and aligned position of the rubber bushing in the housing, thus positively locating the shaft 29 in place.

Impeller 3 is constructed to permit easy exchange of parts, both to compensate for wear and tear, and to permit the use of pump chambers (top housing 33) of different size. The impeller 3 has three impeller vanes or impeller blades 37, made of elastic material for example rubber, flexible plastic or the like. Each impeller blade 37 has a cylindrical internal extension 38 which fits into an axial cylindrical hole 39 formed in hub 26. The hole is open towards the outside, to permit deflection of the impeller blade 37 to either side from its radial position by an angle of about 23° (the angle is not critical, and more or less deflection may be suitable). The impeller blades 37 are held on the hub 26 by an elastic disk 40, snapped over a conical projection 41 in the hub. This permits removal of disk 40, and replacement of the impeller blades 37.

Figure 2:
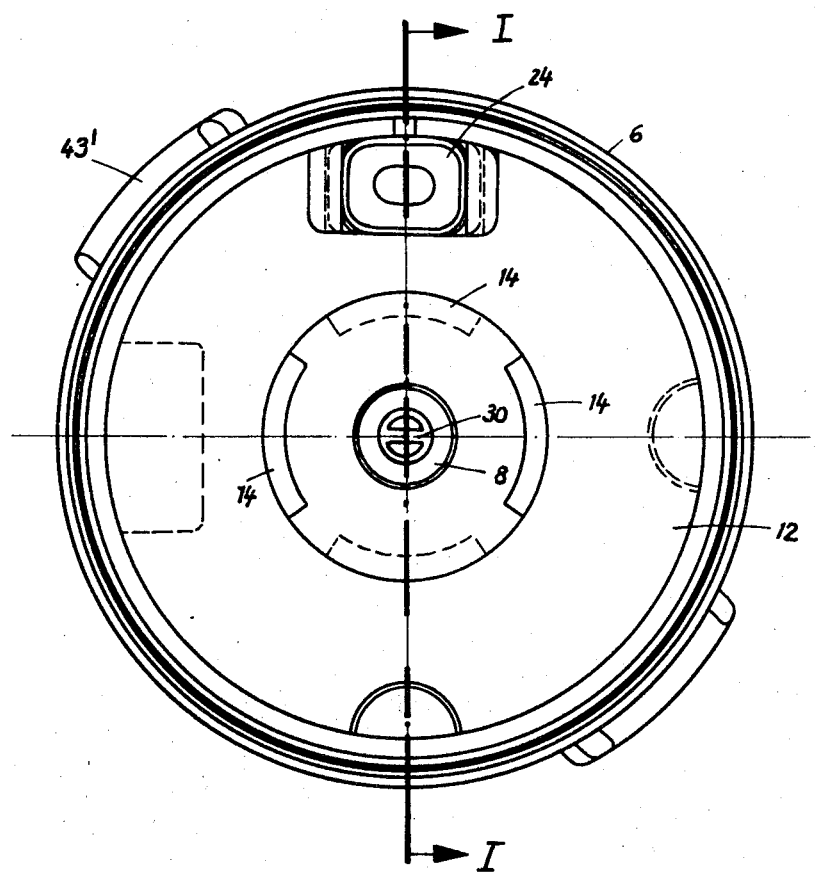
FIG. 2 is a top view of the pump.

The housing portion 6 is formed with an axial extension 42 (FIG. 1), into which the pump portion 33 of the housing fits. A circumferential O-ring 43 is set into a suitable notch, the entire assembly being retained together by a snap ring with an overlap bearing against the upper side of shoulder 44 (and not shown), or in some other structural unit, for example the housing of a filter for use in an aquarium. When inserted into an aquarium, for example, a projection 43' (FIG. 2) can be locked with a notch formed in a circular opening of the filter of the aquarium, to securely lock the motor-pump assembly in the manner of a bayonet connection. The pump chamber cover 33 is then pressed by its shoulder 44 on projection 42 of the lower housing portion 6 to provide secure and water-tight connection between the two housing portions 33 and 6.

Figure 3:
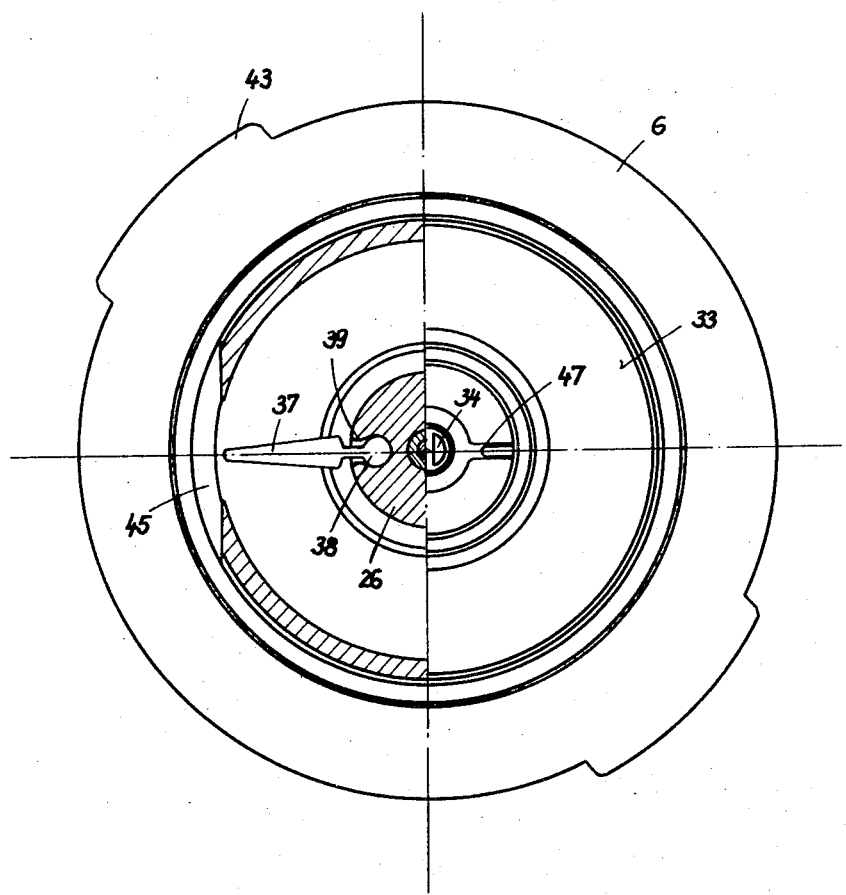
FIG. 3 is a half-sectional view along line III—III of FIG. 1 and a half-top view of the pump and motor unit.
Figure 4:
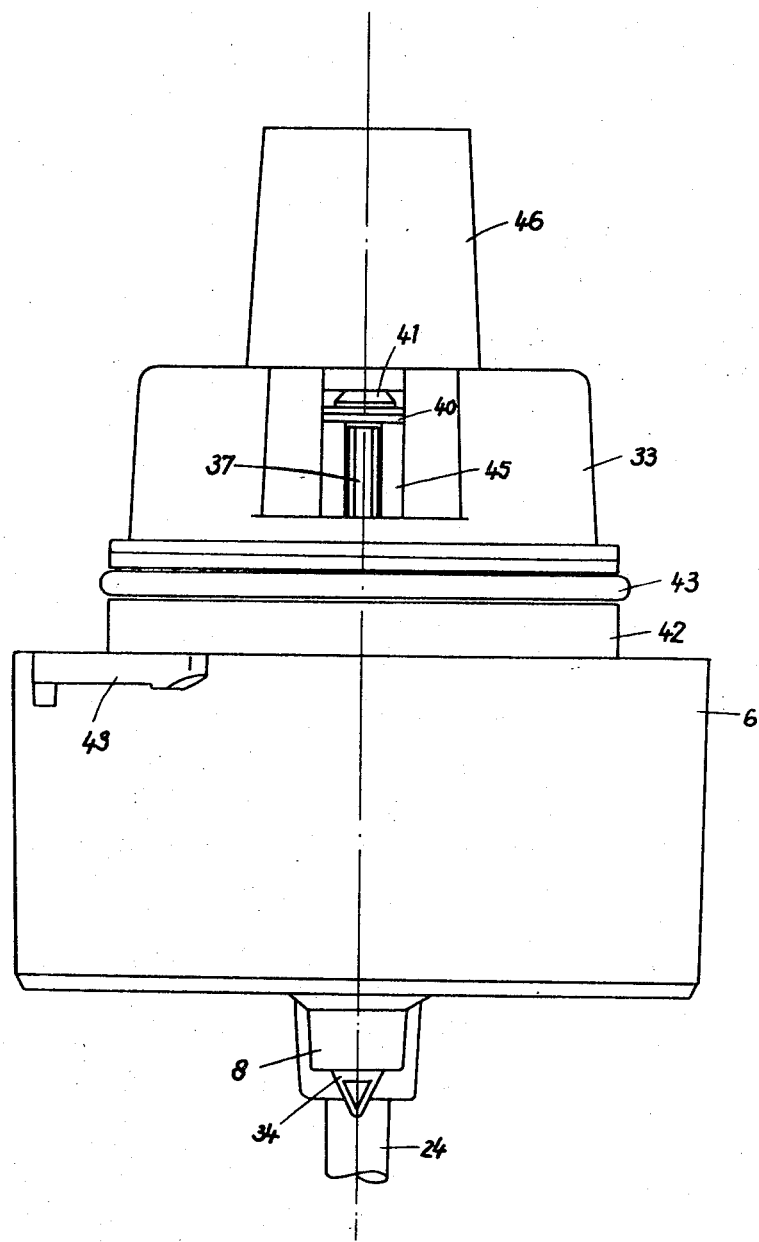
FIG. 4 is a side view of the pump unit.

Three symmetrically distributed pump discharge openings 45 are formed in the pump chamber housing 33; only one of these openings 45 is seen in FIGS. 1 and 3, respectively. The pump chamber housing cover 33 additionally is formed with a suction stub 46 in which the upper bearing bushing 30 is held by means of a spider 47 formed therein, and permitting axial passage of water.

The motor as described in the foregoing example is shown as a four-pole construction; it can readily be made with more, or lesser number of poles. The particular construction of the housing permits wide possibilities of use, for example as time control, for automatic feeding arrangements and the like, merely by fitting a suitable top cover 33 to the motor-shaft assembly.

Various changes and modifications may be made within the inventive concept.

I claim:

1. Motor-pump combination comprising
   a plastic housing having one portion (6) in which the motor is located and another portion (33) in which the pump is located;
   a pump impeller (3) in the pump portion coupled to the rotor (4) of the motor (1), wherein said motor is a self-starting synchronous motor, and the rotor (4) is a permanent magnet rotor;
   the motor portion of the housing being formed in cup-shaped configuration having an inner sleeve (7) closely surrounding the rotor and leaving an air gap therebetween;
   bearing means (8, 30, 29, 28; 27, 32) journalling the rotor in the sleeve to permit rotation of the rotor relative to the sleeve;
   a stator (5) having a stator winding (19) therein, a pair of disks (12) of magnetizable material located at the end faces of the winding, an outer sleeve (10) of magnetic material surrounding the winding and being in magnetic flux transfer with said disks;

and inner pole shoes (14) of asymmetrically shaped cylindrically bowed strips, alternately connected in flux transfer to one and the other of said disks (12) and facing the outer wall of said inner cylindrical sleeve (7) of plastic material to permit interaction of the permanent magnet rotor, through the plastoc material, with the rotational field generated by the asymmetric pole shoes, alternately connected to one and the other of said end disks (12), and to provide for self-starting operation of the motor and synchronous operation after synchronous speed has been reached.

2. Combination according to claim 1, wherein the pole shoes (14) are shaped strips of cylindrical segments, each strip being formed with a cut-out (17) at the side remote from the side connected to the associated end disk (12), said cutout extending both over the side (15) of the strip as well as over the end (16) thereof.

3. Combination according to claim 1, further comprising a coil form (18), the coil (19) being a toroidal coil, and surrounding said sleeve (7) of plastic material from the outside thereof, said coil form being formed with recesses (20) shaped similarly to the shape of said pole shoes (14) to locate the pole shoes therein and hold the pole shoes in position with respect to the stator (5).

4. Combination according to claim 3, wherein the coil form is formed with axially extending limit strips (21) adjacent the recesses (20) and defining the edges of the recesses to locate the pole shoes (14) in position and alignment.

5. Combination according to claim 3, wherein the end disks (12) are formed with notches (25) and the coil form is formed with matching projections (23) to secure the disks in position and alignment with respect to the coil (19).

6. Combination according to claim 1, wherein the stator comprises a stator assembly (5) including a stator winding and the pole shoes (14), the assembly being encapsulated in the housing by a plastic casting mass.

7. Combination according to claim 1, wherein the rotor (4) comprises a rotor shaft (26,29), a pair of holding bushings (30), each being elastically secured in the housing, said sleeve (7) being formed with a bottom wall, one bearing bushing being located in the bottom wall of the sleeve, and the other bearing bushing being located in the pump portion of the housing.

8. Combination according to claim 7, wherein the rotor shaft supports the rotor (4) and the pump impeller (3) and the elastic bearing bushings of the shaft of the rotor comprise rubber bushings (30).

9. Combination according to claim 7, wherein the bearing bushings are rubber bushings fitted in respective housing portions, the housing portions and the rubber bushings being formed with matching shoulders and slots (35, 36) to locate the bushings in the housing.

10. Combination according to claim 7, wherein at least one of the bushings is closed at the end to form the end closure of said combination and comprises a projecting tip (34) to provide a gripping surface for seating of the bushing.

11. Combination according to claim 1, wherein the impeller (3) has a cylindrical hub (26) and impeller blades (37) secured to the hub and swingably mounted therein to swing over a restricted arc about an axis parallel to the axis of rotation of the impeller.

12. Combination according to claim 11, wherein the hub (26) is formed with a pair of inner, cylindrical sleeves (27,28) forming bearing bushings,
   a central stationary shaft is provided located in the housing and the hub is rotatably journalled on said shaft by said cylindrical sleeves.

13. Combination according to claim 11, wherein the impeller blades (37) are of elastic material.

14. Combination according to claim 11, wherein the hub is formed with cylindrical, axially extending holes (39) and passages open to the outer circumference;
   the impeller blades (37) are formed with cylindrical end projections (38) fitting into the cylindrical holes;
   and a closure element (40) is provided retaining the end projection in the holes.

15. Combination according to claim 14, wherein the closure element is an end face disk (40) located on the hub (26).

16. Combination according to claim 11, wherein the pump portion of the housing (33) is shaped to define a pump chamber (2), said impeller (3) being rotatably positioned in said chamber;
   and said pump chamber is formed with three symmetrically located outlet openings (45) and an inlet stub (46) is provided on the pump portion of the housing (33), located coaxially to the axis of rotation (9) of the pump; and a bearing spider (47) securing the shaft in position within the inlet stub.

17. Combination according to claim 7, wherein the shaft (29) is stationary, an elongated sleeve (26) connecting the pump impeller (3) and the rotor (4) and surrounding said shaft (29) and being journalled thereon.

18. Combination according to claim 17, wherein the sleeve (26) and the shaft (29) are connected by axially unrestrained bearings (27, 28), the alignment of the rotor (4) and the impeller (3) being obtained by magnetic force due to interaction of the permanent magnetism of the rotor and the pole shoes (14) of the stator.

* * * * *